Patented Oct. 30, 1945

2,387,997

UNITED STATES PATENT OFFICE 2,387,997

METALLIZABLE POLYAZO TRIAZINE DYESTUFFS

Otto Kaiser, Basel, Switzerland, assignor to Society of Chemical Industry in Basle, Basel, Switzerland, a Swiss firm No Drawing. Application May 1, 1944, Serial No. 533,661. In Switzerland June 25, 1943

4 Claims. (Cl. 260—153)

It has already been recommended to manufacture dyestuffs containing two different lake-forming elements, that is to say on the one hand the atom grouping which is formed by coupling diazotized ortho-aminocarboxylic acid in an alkaline medium with 2-amino-5-hydroxynaphthalene-7-sulfonic acid and, on the other hand, the radical of a dyestuff of the kind of the 4-amino-4'-hydroxy-1:1'-azobenzene-3'-carboxylic acid. Swiss Specification No. 137,651, for example, describes the mixed ureas from 1 mol of the azo-dyestuff from diazotized 1-aminobenzene-2-carboxylic acid-4-sulfonic acid and 2-amino-5-hydroxynaphthalene-7-sulfonic acid (coupled in an alkaline medium) and 1 mol. of 4-amino-4'-hydroxy-1:1'-azobenzene-3'-carboxylic acid. Swiss Specification No. 137,652 describes a ternary condensation product from 1 mol of cyanuric chloride, 1 mol each of the two starting azo-dyestuffs of the just named Swiss Patent No. 137,651 and 1 mol of aniline. Finally, in the French patent of addition No. 37,190 (addition to Patent No. 677,782) there is mentioned the secondary condensation product from 1 mol. of cyanuric chloride and also 1 mol each of the two starting dyestuffs of Swiss Specification No. 137,651. These dyestuffs are characterized by the property of yielding copper compounds which are valuable direct dyestuffs. However, when producing the copper compounds of these dyestuffs on the fiber by after-treating the textile materials dyed with the metal-free dyestuffs with copper, the wet-fastness properties of the textiles are actually improved, but they are not up to the standard required nowadays.

It has now been found that in contradistinction to the above mentioned known dyestuffs, the new products which correspond to the general formula

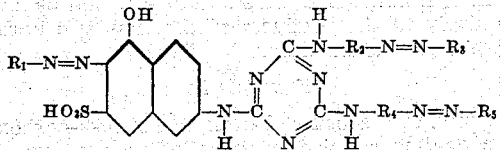

wherein $R_1$, $R_2$, $R_4$ and $R_5$ represent unsulfonated benzene nuclei, $R_1$ carrying a carboxyl group in ortho-position to the azo-group, $R_2$ and $R_4$ containing the NH-group and the azo-group linked in 1:4-position to one another and $R_3$ and $R_5$ containing a hydroxyl group in 4-position to the azo-group and a carboxyl group in ortho-position to this hydroxyl group, are dyestuffs the copper compounds of which, when produced on the fiber, yield dyeings having excellent fastness to light and to wet treatment.

The new dyestuffs are made by methods known to be suitable for the manufacture of such products, for example, the methods described below.

They can be obtained by allowing 1 mol of a diazotized unsulfonated ortho-aminobenzene carboxylic acid, 1 mol of 2-amino-5-hydroxynaphthalene-7-sulfonic acid, 1 mol of cyanuric chloride or 1 mol of cyanuric bromide and 2 mols of unsulfonated 4-amino-4'-hydroxy-1:1'-azobenzene-3'-carboxylic acids to react with one another in such a manner that the diazo compound couples in 6-position of the amino-hydroxy-naphthalene-sulfonic acid, one halogen atom of the cyanuric halide reacts with the amino group of the amino-hydroxynaphthalene sulfonic acid and one halogen atom each of the cyanuric halide reacts with the amino group of one amino-hydroxyazobenzene carboxylic acid, respectively.

The same products can also be obtained when, in this reaction, one or both amino-hydroxy-azobenzene carboxylic acids are replaced by amines of the benzene series which contain in 4-position to the amino group a second amino group or a group capable of being converted into an amino group, and when the reaction is complete, if desired after converting the group capable of being converted into an amino group into such a group, diazotizing or tetrazotizing the condensation product, and then uniting the diazo or tetrazo compound thus formed with 1 mol or 2 mols (in the latter case with identical or different molecules) of a hydroxy compound of the benzene series which couples with diazo compounds in 4-position to the OH-group. It is obvious that the sequence of the operations can be selected so that the reactions proceed in the desired manner. In this way, reaction of the diazotized condensation products with the aminonaphthol sulfonic acid residue is avoided.

For the purpose of introducing the radical $R_1$ into the new azo-dyestuffs one may start, for example, from the diazo compounds of the following amines:

1-aminobenzene-2-carboxylic acid, 1-amino-4-chlorobenzene-2-carboxylic acid, 1-amino-3-chlorobenzene-2-carboxylic acid, 1-amino-3:5-dichlorobenzene-2-carboxylic acid, 1-amino-4-nitrobenzene-2-carboxylic acid, 1-amino-4-acetylaminobenzene-2-carboxylic acid, 1-amino-4-benzoylaminobenzene-2-carboxylic acid, 1-amino-4-bromobenzene-2-carboxylic acid, 1-amino-4:6-dibromobenzene-2-carboxylic acid, 1-amino-4- methoxybenzene-2-carboxylic acid, 1-amino - 4-ethoxybenzene-2-carboxylic acid, etc.

The following aminoazo-dyestuffs can be used for introducing the radicals

—NH—R₂—N=N—R₃ and —NH—R₄—N=N—R₅:

4-amino-4'-hydroxy-1:1'-azobenzene - 3' - carboxylic acid, 4-amino-4'-hydroxy-5'-methyl-1:1'-azobenzene-3'-carboxylic acid, 4-amino - 4'-hydroxy-2'-methyl-1:1'-azobenzene -3' - carboxylic acid, 4-amino-2-methyl-4'-hydroxy-1:1'-azobenzene-3'-carboxylic acid, 4-amino-2-methoxy-4'-hydroxy-1:1'-azobenzene - 3'-carboxylic acid, 4-amino-2-chloro-4'-hydroxy-1:1'-azobenzene - 3'-carboxylic acid, 4-amino-3-methyl-5 - methoxy-4'-hydroxy-1:1'-azobenzene-3'-carboxylic acid, 4-amino-2-methyl-5-methoxy-2' - methyl - 4' - hydroxy-1:1'-azobenzene - 3'-carboxylic acid, and the like. One or both azodyestuff radicals can be introduced also in such a manner that one to two halogen atoms of the cyanuric halide are reacted with compounds such as 1-amino-4-nitrobenzene, 1-amino-4 - acetylaminobenzene, 1-amino-2-methyl- or 2-methoxyazobenzene, 1-amino-2-methoxy-5-methyl-4 - nitrobenzene, and the like. The nitro- or acylamino group is then converted in known manner into a primary amino group, diazotized and the diazo compound is coupled with hydroxy-carboxylic acid of the benzene series, such as 1-hydroxybenzene-2-carboxylic acid or 1-hydroxy-5- or -6-methylbenzene-2-carboxylic acid.

The new dyestuffs are characterized by their affinity for cellulose fiber, both for regenerated and also natural cellulose. They can therefore be used for dyeing cotton, ramie, jute, viscose rayon, cuprammonium silk, staple fibers of regenerated cellulose, if desired, delustred with titanium oxide, which fibers have been produced according to the viscose process or according to the cuprammonium process. They can further be used for dyeing mixtures of these spun materials with e. g. animal fibers such as wool and silk. The new dyestuffs dye such materials more or less yellowish to reddish orange brown shades which become darker by after-treatment on the fiber with agents yelding copper, such as, for example, copper sulfate or an alkaline copper-tartrate solution. The dyeings treated in such a manner possess an excellent fastness to wet treatment combined with an excellent fastness to light.

The following examples illustrate the new process, without however limiting it in any way, the parts being by weight:

*Example 1*

27.4 parts of 1-aminobenzene-2-carboxylic acid are heated to 40° C. in 200 parts of water, 54 parts of concentrated hydrochloric acid are added, cooled with ice to 5° C. and diazotized with 13.8 parts of sodium nitrite. The clear diazo solution is coupled with 174.4 parts of the ternary condensation product from 1 mol. of cyanuric chloride or 1 mol. of cyanuric bromide, 1 mol. of 2-amino-5-hydroxynaphthalene-7 - sulfonic acid, 1 mol. of 4-amino-3-methoxy-6-methyl-4' - hydroxy-1:1'-azobenzene-3'-carboxylic acid and 1 mol. of 4-amino-4'-hydroxy-1:1'-azobenzene-3'-carboxylic acid, previously prepared in known manner and dissolved in 2400 parts of water with addition of 120 parts of sodium carbonate. Stirring is continued for some hours and the formed dyestuff is precipitated with common salt. It corresponds in the free state to the formula:

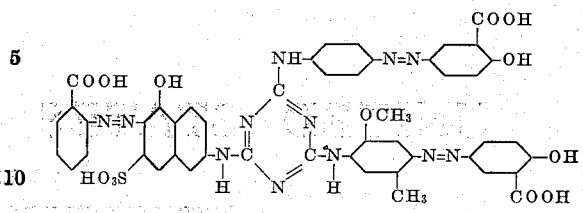

When dry it is a yellow-brown powder which dyes cotton in a feebly alkaline bath weak brownish orange shades. When adding a copper salt solution from copper sulfate and sodium tartrate to the dye-bath, the color tint changes to orange-brown, the dyeing being fast to washing and light.

When using in the triazine product instead of the 4 - amino-3-methoxy-5-methyl-4'-hydroxy-1:1'-azobenzene-3'-carboxylic acid the 4-amino-4'-hydroxy - 1:1'-azobenzene - 3'-carboxylic acid there is obtained a dyestuff which corresponds in the free state to the formula:

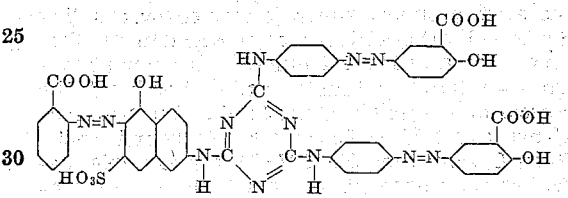

and dyes cotton similar shades having the same fastness properties.

Products obtainable according to the first paragraph of this example can also be prepared by coupling at first the diazotized 1-aminobenzene-2-carboxylic acid with 2-amino-5-hydroxynaphthalene-7-sulfonic acid in an alkaline medium and then reacting in any desired sequence 1 mol. of the resulting monoaminoazo-dyestuff, 1 mol. of 4 - amino - 3 - methoxy - 6 - methyl-4'-hydroxy-1:1'-azobenzene-3'-carboxylic acid and 1 mol. of 4-amino-4'-hydroxy-1:1' - azobenzene - 3' - carboxylic acid with 1 mol. of cyanuric chloride.

The product obtainable according to the second paragraph of this example can also be prepared by producing at first a ternary condensation product from 1 mol. of the azo-dyestuff from diazotized 1-aminobenzene - 2 - carboxylic acid and 2-amino-5-hydroxynaphthalene-7 - sulfonic acid and 2 mols. of 1-amino-4-acetylaminobenzene, then splitting off the two acetyl groups by treating with saponifying agents, tetrazotizing the resulting diamino compound and finally coupling with 2 mols. of 1-hydroxybenzene - 2 - carboxylic acid.

The procedure is similar with the different intermediate products indicated in the introduction, dyestuffs being thus obtained which behave similarly to the products of the first two paragraphs of this example.

*Example 2*

1 mol. of diazotized 1-aminobenzene-2-carboxylic acid is coupled in an alkaline medium in known manner with 1 mol. of 2-amino-5-hydroxynaphthalene-7-sulfonic acid. 38.7 parts of the resulting monoazo-dyestuff are dissolved in 1500 parts of water as sodium salt and gradually added, while vigorously stirring, to 18.4 parts of cyanuric chloride suspended in 500 parts of water. The hydrochloric acid thus formed is neutralized with the corresponding quantity of sodium carbonate. When the condensation is complete, 51.4 parts of 4-amino-4'-hydroxy-1:1' - azobenzene - 3' - carboxylic acid dissolved as sodium salt in 1000 parts of water are added and the temperature of the mixture is raised to 40° C. This temperature is maintained for 2 hours, the resulting hydrochloric acid is again neutralized with the corresponding quantity of sodium carbonate and the temperature raised to 80–85° C. This temperature is maintained for 3 hours and the formed dyestuff is separated as sodium salt by means of common salt. When dry it is a yellow-brown powder. The new dyestuff corresponds to the product of the second paragraph of Example 1.

*Example 3*

100 parts of cotton are introduced at 40–50° into a dye-bath consisting of 3000 parts of water, 1.5 parts of the dyestuff prepared according to the first paragraph of Example 1, and 2 parts of anhydrous sodium carbonate. The bath is heated to 90–95° C. within ½ hour, 30 parts of crystallized sodium sulfate are added and dyeing is continued for ¾ hour at this temperature. A solution neutralized with caustic soda solution consisting of 2 parts of crystallized copper sulfate and 2.5 parts of tartaric acid in 100 parts of water is added to the dye-bath and the cotton is treated for ½ hour at about 95° C. It is then rinsed and dried as usual. The cotton is dyed fast orange brown shades.

As mentioned already in the introduction, the dyestuffs of the present invention can also be used for dyeing mixed fabrics, for example mixtures of wool and viscose cellulose wool. In such cases it is appropriate to dye in a neutral bath in the presence of sodium chromate or potassium chromate.

What I claim is:

1. The dyestuffs corresponding in the free form to the general formula

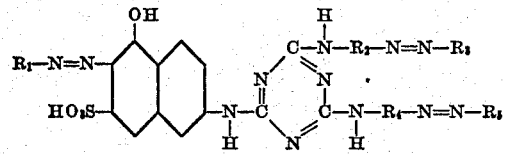

wherein $R_1$, $R_2$, $R_3$, $R_4$ and $R_5$ represent unsulfonated benzene nuclei, $R_1$ carrying a carboxyl group in ortho-position to the azo-group, $R_2$ and $R_4$ containing the NH-group and the azo-group linked in 1:4-position to one another and $R_3$ and $R_5$ containing a hydroxyl group in 4-position to the azo-group and a carboxyl group in ortho-position to this hydroxyl group.

2. The dyestuffs corresponding in the free form to the general formula

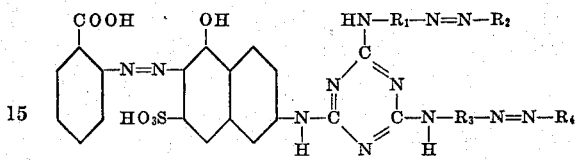

wherein $R_1$, $R_2$, $R_3$ and $R_4$ represent unsulfonated benzene nuclei, $R_1$ and $R_3$ containing the NH-group and the azo-group linked in 1:4-position to one another, and $R_2$ and $R_4$ containing a hydroxyl group in 4-position to the azo-group and a carboxyl group in ortho-position to this hydroxyl group.

3. The dyestuff corresponding in the free form to the formula

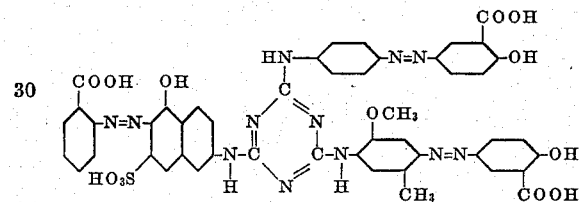

4. The dyestuff corresponding in the free form to the formula

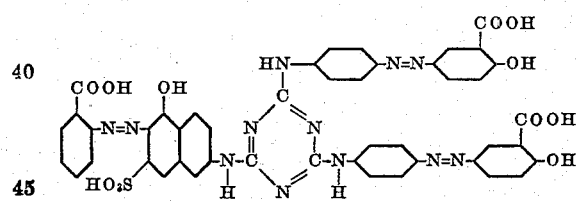

OTTO KAISER.